United States Patent
Buechel (12) 
(10) Patent No.: US 8,280,410 B1
(45) Date of Patent: Oct. 2, 2012

(54) VIRTUAL RECYCLING SYSTEM

(76) Inventor: Thomas Andrew Buechel, Rockaway, NJ (US)

( * ) Notice: Subject to any disclaimer, the term of this patent is extended or adjusted under 35 U.S.C. 154(b) by 0 days.

(21) Appl. No.: 13/456,295

(22) Filed: Apr. 26, 2012

Related U.S. Application Data (60) Provisional application No. 61/479,480, filed on Apr. 27, 2011.

(51) Int. Cl.
*H04W 24/00* (2009.01)

(52) U.S. Cl. .............. 455/456.3; 455/414.2; 455/414.3; 455/456.1; 705/308

(58) Field of Classification Search .................. 705/308; 455/456.1–456.3, 404.2, 414.2, 414.3, 466
See application file for complete search history.

(56) References Cited

U.S. PATENT DOCUMENTS

| | | | |
|---|---|---|---|
| 4,951,212 A | | 8/1990 | Kurihara et al. |
| 6,729,540 B2 * | | 5/2004 | Ogawa ........................ 235/384 |
| 7,158,878 B2 | | 1/2007 | Rasmussen et al. |
| 7,379,811 B2 | | 5/2008 | Rasmussen et al. |
| 7,511,611 B2 * | | 3/2009 | Sabino et al. ................. 340/500 |
| 7,822,816 B2 | | 10/2010 | Payne |
| 7,945,546 B2 | | 5/2011 | Bliss et al. |
| 8,041,506 B2 | | 10/2011 | Bliss et al. |
| 2002/0052674 A1 | | 5/2002 | Chang et al. |
| 2010/0191551 A1 | | 7/2010 | Drance et al. |

* cited by examiner

*Primary Examiner* — Anthony Addy
*Assistant Examiner* — Yousef Rod (57) ABSTRACT

A method for enabling users over the world wide web and cellular phone networks to interact with an interactive recycling system, assisting the user in performing tasks involved in the recycling of scrap metals and other materials. The system offers the user resources, services, and ideas according to parameters collected from the user and from the providers of said resources, services and ideas. The system guides the user to receive the most desired, convenient and financially advantageous resources, services and ideas, while allowing said providers a mechanism for innovating business methods, pricing and marketing. The system automatically guides the user to the desired resources, services and ideas by executing various tools, such as real time pricing comparisons, geographic advisory information, GPS navigation, text and/or audio chat, resource analysis, and preparatory transactions. The system adds graphics, animation, and other media to make the session more informative and enjoyable for the user.

7 Claims, 8 Drawing Sheets

VIRTUAL RECYCLING SYSTEM

CROSS-REFERENCE TO RELATED APPLICATIONS

This application claims the benefit of U.S. Provisional Patent Application No. 61/479,480, filed on Apr. 27, 2011, which is hereby incorporated by reference herein in its entirety.

FIELD OF THE INVENTION

This is directed to providing access to recycling services using a portable electronic device.

BRIEF SUMMARY

Background of the Invention

The present invention relates to a virtual recycling system which operates to advise and assist users in the acquisition of the most convenient and desirable recycling services. The system makes comprehensive information relevant to the recycling services, as well as specified actual services themselves, fully accessible to the user instantaneously and in a highly portable manner. This is accomplished by utilizing a computerized mobile interface device connected to an information network to gather user specific information, and a method of analyzing and subsequently transforming said information into useful direction, both graphical and non-graphical in nature, and of remotely initiating transactions involving the desired recycling services.

At present, with respect to the recycling/scrapyard industry, it is common that contractors, home remodelers, and other professionals and non-professionals working and/or operating in various construction related capacities ("Contractors") are tasked with disposing of waste materials produced as a result of the construction and/or remodeling work thus commissioned. Because a Contractor's job site may be at any geographic location and may involve various types of materials which may or may not produce recyclable waste, a common problem is created whereby the Contractor may be devoid of knowledge as to whether or not local recycling services can be had with respect to the specific materials being used, the location of such recycling services, and real-time comparisons as to the financial benefits of local versus non-local recycling services.

Currently, aside from the present invention there exists no national or international system in the United States of America or elsewhere which both serves the purposes of aggregating the information relating to all recycling services available in a geographic location, and analyzing information specific to individual Contractors for the purpose of automatically directing said Contractors to the most desirable recycling services. Furthermore, because of the nature of the construction and remodeling related industries, whereby Contractors perform a substantial amount of their work on the road or at the job site, such a system which is not highly mobile would not provide a product that is a useful improvement to the trade. However, as a result of recent advancements in cellular "Smart Phone" technology, it has become possible to provide the results of highly complex computations and visual/pictorial directions, in addition to other valuable communications and transactions, to Contractors virtually anywhere and at any time. Thus, the present invention improves upon the current state of art by utilizing recent advances in micro-computing, software, and graphical user interfaces to provide a new and useful product to Contractors which was not possible previously.

SUMMARY OF TILE INVENTION

As noted above, the conventional methodology by which Contractors obtain recycling services involves a low-tech trial and error approach utilizing information received via print media and immobile personal computers connected to a wired internet service. Some Contractors may obtain recycling services from the first provider that such Contractors make contact with and continue to obtain recycling services from the same provider until the recycling services become inadequate. Some Contractors may make educated guesses on a case by case basis as to which recycling service provider will be most convenient to a given job site, with little to no assurance that said recycling service provider can provide the desired services or the most favorable rates.

In light of the foregoing, it is an object of the present invention to solve the problem of low-tech trial and error recycling and scrap metal-ing, by introducing a high tech process that allows for Contractors to have instantaneous access to all of the knowledge necessary for the efficient disposal of recyclable waste materials.

In furtherance of providing a high-tech solution to an age-old problem in the construction and remodeling industries, the present invention is designed such that, once installed in a computerized mobile interface device such as a mobile or cellular "smart" telephone, the present invention automatically accesses the computerized mobile interface device's Global Positioning Service or geographic locator ("GPS") technology in order to facilitate a range of tools meant to provide both visual and text based direction to the user.

According to an aspect of the present invention, in a computerized mobile interface device having: (1) a GPS enabled connection; (2) a display screen capable of displaying pictorial representations such as photographs, animations and maps; (3) an integrated camera capable of capturing pictorial images; (4) processing capabilities enabling the display of photographs, animations and maps as well as the collection, analysis and exchange of data; and (5) a mobile connection to the world wide web, there is provided a pictorial and textual interface providing method for providing pictorial and textual interfaces concerning location of and directions to recycling or scrapping facilities that meet a predetermined requirement, comprising of the steps of: (a) making said computerized mobile interface device accept the installation, activation and/or execution of computer software facilitating the invention; (b) obtaining information concerning said computerized mobile interface device and the user of said computerized mobile interface device, including but not limited to the history of said user's operation of the invention and said user's current GPS location, via user input or software facilitating automated data transfer; (c) determining the nature of said user's required recycling related services via user input and software facilitating automated data transfer or analysis of other available information; (d) where step (c) indicates that said user requires direction to nearby recycling services, analyzing the information obtained in step (b) and transforming the output of said analysis via software utilizing the computerized mobile interface device's processing capabilities into pictorial and textual representations of the location of and/or directions to nearby recycling services; (e) where step (c) indicates that said user requires pricing for recycling services, analyzing the information obtained in step (b) and transforming the output of said analysis via software utilizing the computerized mobile interface device's processing capabilities into pictorial and textual representations of the pricing for nearby and/or selected recycling services; (0 where step (c) indicates that said user requires containment and/or storage related services, analyzing the information obtained in step (b) and transforming the output of said analysis via software utilizing the computerized mobile interface device's processing capabilities into pictorial and textual representations of pricing, location and availability of nearby containment and/or storage related services; (g) where step (c) indicates that said user requires identification of potentially recyclable materials, analyzing the information obtained in step (b) via software utilizing the computerized mobile interface device's processing capabilities and accessing the computerized mobile interface device's integrated camera to capture a pictorial representation of said materials to be transmitted to nearby recycling services for identification; and (h) where step (c) indicates that said user requires general information about potentially recyclable materials, accessing the invention's database and subsequently transferring and manifesting a pictorial and textual representation approximating the requested general information via software utilizing the computerized mobile interface device's processing capabilities.

According to an example of the present invention, said GPS enabled connection allows for information identifying the current location of the user to be updated continuously, thus allowing for dynamic updating of all location-related pictorial and textual representations.

According to an example of the present invention, said step (b) includes a substep of accessing software utilizing the computerized mobile interface device's processing capabilities which automatically determines the most recent activity of the invention among steps (d) through (h), in order to re-activate said activity.

According to an example of the present invention, said step (d) includes a substep of accessing software utilizing the computerized mobile interface device's processing capabilities which automatically obtains data from the invention's internet and/or server based database in order to continuously update locally stored information related to said nearby recycling services.

According to an example of the present invention, said step (e) includes a substep of accessing software utilizing the computerized mobile interface device's processing capabilities which automatically obtains data from the invention's internet and/or server based database in order to continuously update locally stored information related to said nearby and/or selected recycling services.

According to an example of the present invention, said step (f) includes a substep of accessing software utilizing the computerized mobile interface device's processing capabilities which automatically obtains data from the invention's internet and/or server based database in order to continuously update locally stored information related to said containment and/or storage related services.

According to an example of the present invention, said step (g) includes a substep of accessing software utilizing the computerized mobile interface device's processing capabilities which automatically obtains data from the invention's internet and/or server based database in order to continuously update locally stored information related to nearby recycling services.

According to an example of the present invention, said step (h) includes a substep of accessing software utilizing the computerized mobile interface device's processing capabilities which automatically obtains data from the invention's internet and/or server based database in order to continuously update the invention's computerized mobile interface device database.

According to an aspect of the present invention, in computing devices including but not limited to desktop computers, laptop computers, tablet computers and other mobile computers having: (1) a display screen capable of displaying pictorial representations such as photographs, animations and maps; (2) processing capabilities enabling the display of photographs, animations and maps as well as the collection, analysis and exchange of data; (3) a connection to the world wide web, and (4) installed internet browser software, there is provided a pictorial and textual interface providing method for providing a pictorial and textual interface concerning the aggregation, analysis and transmission of recycling related data to mobile interface devices comprising of the steps of: (i) making said computing device accept the installation, activation and execution of computer software facilitating the invention; (j) obtaining information concerning said computing device and the user of said computing device, including but not limited to the history of said user's operation of the invention, via user input or software facilitating automated data transfer; (k) determining the nature of said user's required recycling related services via user input and software facilitating automated data transfer or analysis of other available information; and (l) where step (k) indicates that said user requires information updating services, analyzing the information obtained in step (j) via software utilizing the computing device's processing capabilities, obtaining any additional updated information from said user via user input or software facilitating automated data transfer, and automatically updating the invention's internet and/or server based database via said software.

Common use of the invention may involve the identification of the type, quality or quantity of recyclable material which the user possesses or desires, turn by turn GPS navigation to the closest or most desirable recycling facility, and/or an automated financial transaction by which the user orders a container or storage equipment to be delivered to the user's current location.

DETAILED DESCRIPTION

Description of the Preferred Embodiments

Figure 8:
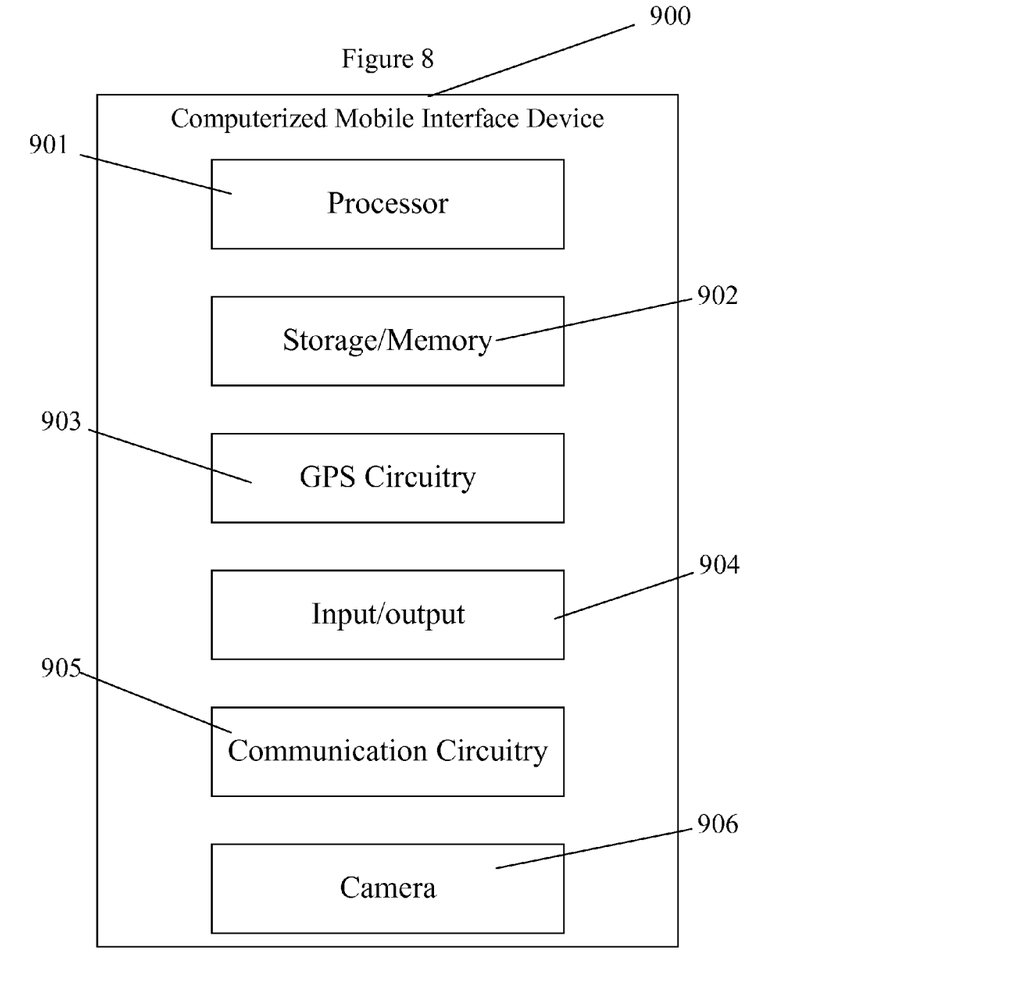
FIG. 8 is a schematic view of an illustrative mobile interface device for installing and operating a software program according to the present invention, which includes a processor assigned reference numeral 901, storage/memory assigned reference numeral 902, GPS circuitry assigned reference numeral 903, intput/output mechanisms assigned reference numeral 904, communication circuitry assigned reference numeral 905, and camera assigned reference numeral 906.

FIG. 8 is a schematic view of an illustrative mobile interface device for installing and operating a software program according to the present invention. Mobile interface device 900 can include a processor 901, storage/memory 902, GPS circuitry 903, input/output mechanisms 904, communication circuitry 905, and camera 906. In some embodiments, one or more of the components of mobile interface device 900 can be combined or omitted. In some embodiments, mobile interface device 900 can include other components not combined or included in those shown in FIG. 8 or several instances of the components shown in FIG. 8.

Mobile interface device 900 can include any suitable type of mobile interface device. For example, mobile interface device 900 can include a mobile interface device that the user can hold in his or her hand, such as a personal digital assistant, a smart phone, or a handheld music player or gaming device. As another example, mobile interface device 900 may include a tablet computer or a laptop computer. As yet another example, mobile interface device 900 may even include a sufficiently mobile desktop computer.

Processor 901 can include any processing circuitry or processor operative to control the operations and performance of mobile interface device 900, such as running an operating system or various installed applications including a software program according to the present invention, and accessing information stored in storage/memory 902.

Storage/memory 902 can include one or more storage mediums or memory including a hard-drive, flash memory, solid state drive, semi-permanent memory such as RAM, or any other suitable type of storage or memory component capable of permanently or temporarily storing application data, firmware, media data, user input data, operating system data, GPS data, and any other suitable data or combination thereof.

GPS circuitry 903 can include any GPS circuitry or any device capable of sending and receiving global positioning system data or other geographic location identification data, and converting such data into information useful in determining the location and direction of mobile interface device 900 and its user.

Input/output mechanism 904 can operate to convert (and encode/decode, if necessary) analog signals and other signals into digital data, or vice versa. Input/output mechanism 904 may also convert digital data into any other type of signal and vice-versa. For example, input/output mechanism 904 can receive and convert physical contact inputs, physical movements, audio signals, video signals, GPS or other locating signals, or any other input. The digital data can be provided to and received by Processor 901, Storage/memory 902, GPS circuitry 903, and any other component of mobile interface device 900. In some embodiments, input/output mechanism 904 can include specialized output circuitry such as one or more audio outputs. Input/output mechanism 904 includes display circuitry for providing a display visible to the user.

Communication circuitry 905 can include any suitable communications circuitry operative to connect to a communications network such as a cellular phone network or the world-wide-web, and to transmit communications from electronic devices to other devices over such communications network. Communications circuitry may include Wi-Fi (e.g., an 802.11 protocol), Bluetooth®, radio frequency systems (e.g. 900 MHz, 1.4 GHz, and 5.6 GHz communications systems), infrared, GSM, CDMA, quadband, and other cellular protocols, VOIP, or any other suitable protocol.

Camera 906 can include any suitable camera or any similar device integrated into or connected to the mobile interface device, allowing the user to capture photographs or video, transform such photographs or video into data, and store such data in storage/memory 902.

Figure 1:
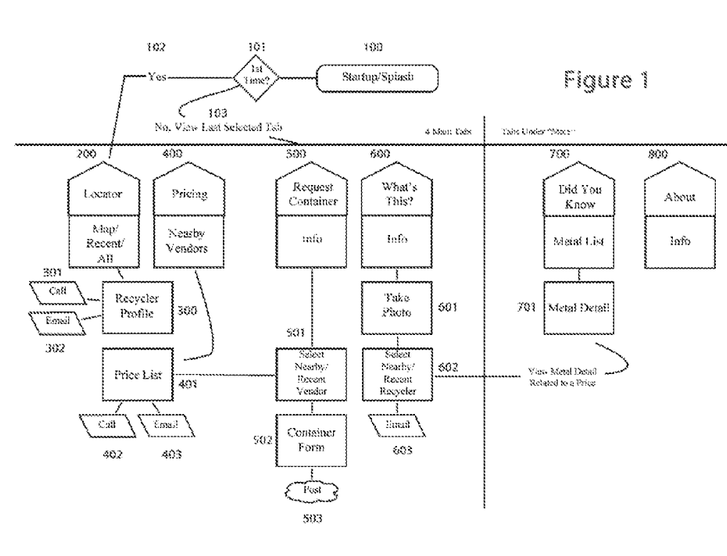
FIG. 1 is a flow chart diagram showing the configuration of an embodiment of a software program according to the present invention.
Figure 2:
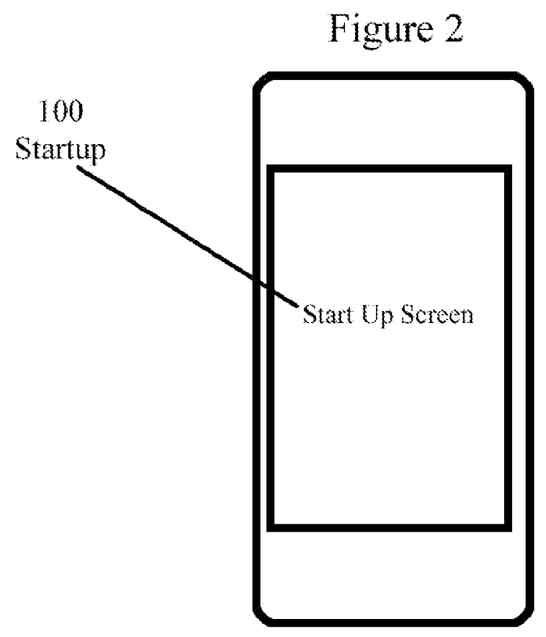
FIG. 2 is a pictorial representation of a computerized mobile interface device displaying the startup of the software program embodied by FIG. 1, assigned reference numeral 100.
Figure 3:
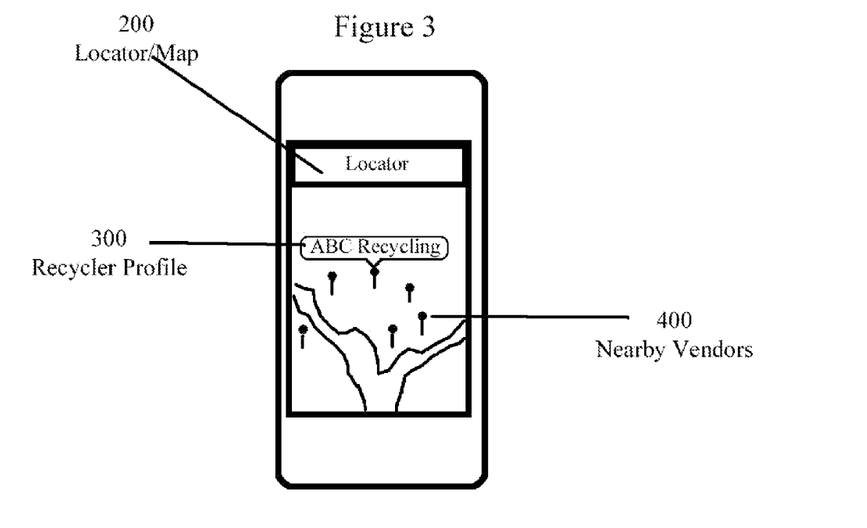
FIG. 3 is a pictorial representation of a computerized mobile interface device displaying: the locator of the software program embodied by FIG. 1, assigned reference numeral 200; the recycler profile interface of said software program, assigned reference numeral 300; and the location indicators of nearby vendors, assigned reference numeral 400.
Figure 4:
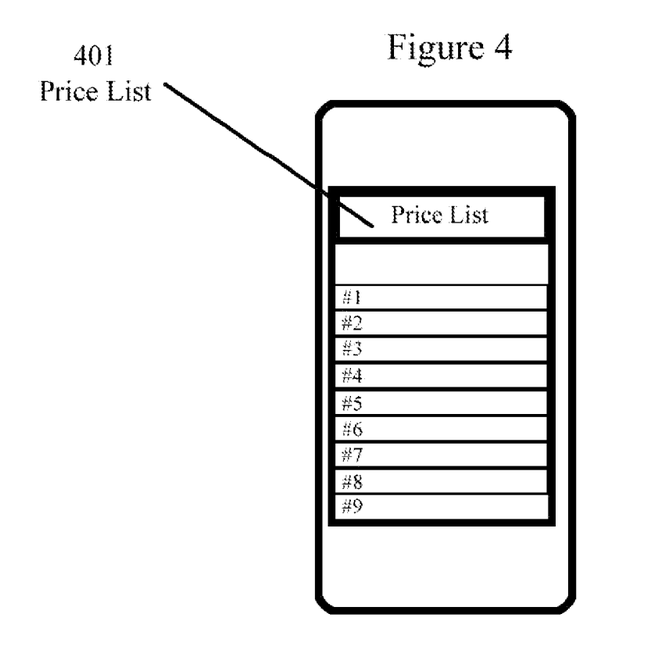
FIG. 4 is a pictorial representation of a computerized mobile interface device displaying the price list of the software program embodied by FIG. 1, assigned reference numeral 401.
Figure 5:
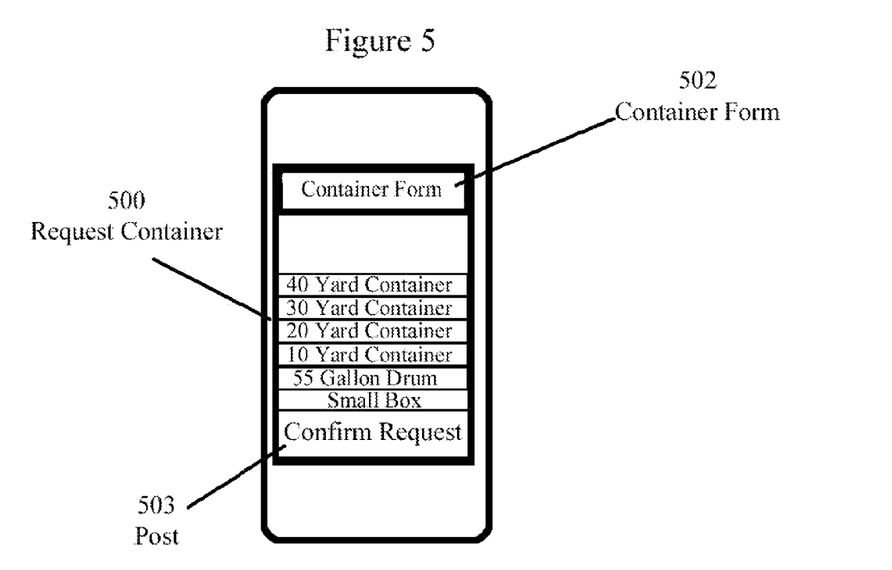
FIG. 5 is a pictorial representation of a computerized mobile interface device displaying: the container request list of the software program embodied by FIG. 1, assigned reference numeral 500; the container request form of said software program, assigned reference numeral 502; and the container request confirmation of said software program, assigned reference numeral 503.
Figure 6:
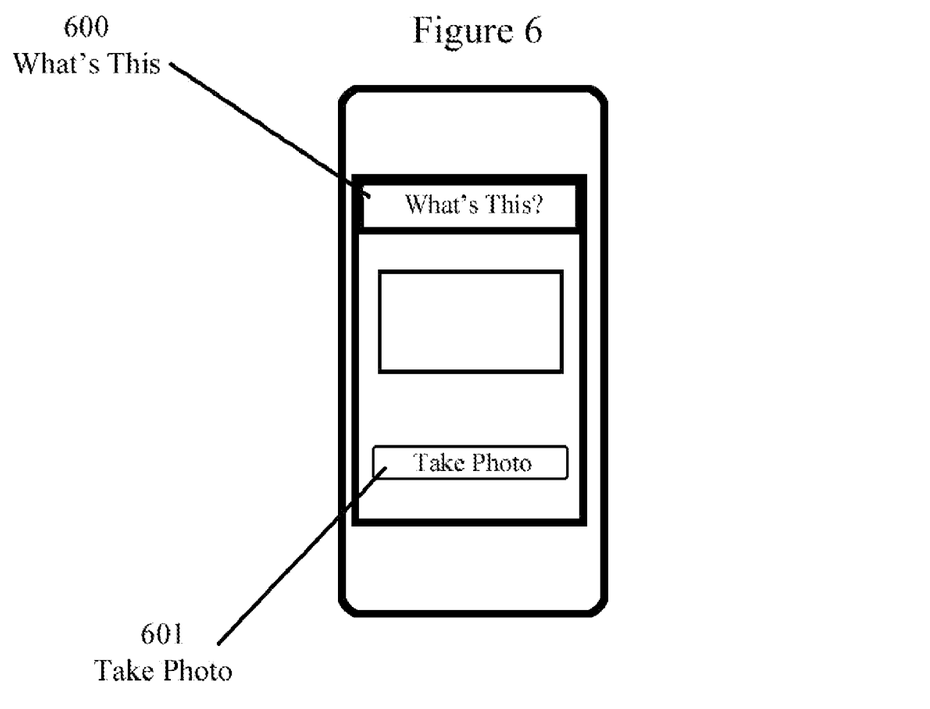
FIG. 6 is a pictorial representation of a computerized mobile interface device displaying: the information requesting interface of the software program embodied by FIG. 1, assigned reference numeral 600; and the function of the interface facilitating access to the said computerized mobile interface device's integrated camera, assigned reference numeral 601.
Figure 7:
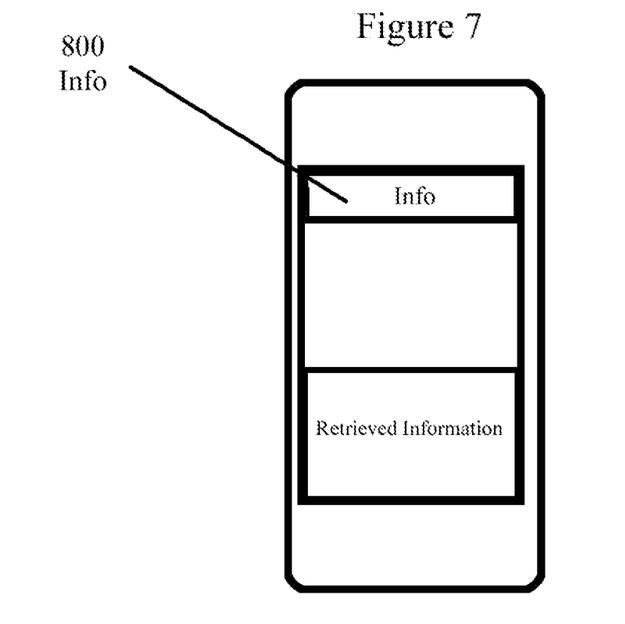
FIG. 7 is a pictorial representation of a computerized mobile interface device displaying the result of a query into the invention's local information database, assigned reference numeral 800.

FIG. 1 is a flow chart diagram showing an example of configuration of a software program embodying a virtual recycling system according to the present invention. Said software program may be an application optimized for various mobile computer operating systems, such as Apple®'s iOS, and Google®'s Android OS 1.6. Said application may interface with a database based upon Microsoft®'s SQL 2008 and running on a Microsoft® Windows 2008 Server. Such application may connect to data through a REST Web Service. In FIG. 1, the reference numeral 100 designates the startup screen displayed by input/output mechanism 904 once said virtual recycling system is accessed by processor 901. The reference numerals 101 to 103 describe the initial process of said system subsequent to startup, where a query is made as to whether or not said system is being accessed for the first time. If said system is being accessed for the first time, said system will automatically proceed to the locator, assigned reference numeral 200, or a pre-designated home page. If said system is not being accessed for the first time, said system will automatically proceed to the most recent function of said system accessed by the user. Reference numeral 200 designates the locator function of said system, which automatically accesses the computerized mobile interface device's integrated GPS circuitry 903 to determine the location of the user and the locations of nearby recycling services. Reference numerals 300 designate the recycler profile function of said system which allows information about providers of recycling services to be downloaded to storage/memory 902 from the invention's internet and/or server based database and displayed to the user via input/output mechanism 904, and reference numerals 301 and 302 designate the functions of said recycler profile which allow the user to immediately place a telephone call or transmit an electronic message to said provider of services via communication circuitry 905. Reference numeral 400 designates the pictorial representation(s) of the actual geographic location(s) of nearby providers of recycling services displayed by input/output mechanism 904. Reference numeral 401 designates the function of said system which displays via input/output mechanism 904 the pricing information for nearby providers of recycling services as obtained by the locator function. Reference numeral 402 and 403 designate the functions of said system which allow the user to immediately place a telephone call or transmit an electronic message to said nearby providers of recycling services via communication circuitry 905.

Reference numeral 500 designates the request container function of said system, which allows the user to request via communication circuitry 905 containment/storage services from any one of the nearby providers of recycling services as obtained by the locator function. Reference numeral 501 designates the function of said system which allows the user to select a nearby provider of recycling services or the most recently selected provider. Reference numeral 502 designates the function of said system whereby the user may access a request form for containment/storage services which is to be transmitted to a selected provider via communication circuitry 905. Reference numeral 503 designates the function of said system whereby said form is transmitted electronically to said provider via communication circuitry 905. Reference numeral 600 designates the function of said system whereby the user may request information from a selected nearby provider of recycling services regarding recyclable materials via communication circuitry 905. Reference numeral 601 designates the function of said system whereby the user may access the computerized mobile interface device's integrated camera 906 in order to store an image of said recyclable material in storage memory 902. Reference numeral 602 designates the function of said system which allows the user to select a nearby provider of recycling services or the most recently selected provider to receive the transmission of said image via communication circuitry 905. Reference numeral 603 designates the function of said system whereby the user transmits said image to said provider via communication circuitry 905. Reference numerals 700 and 701 designate the function of said system whereby the user may access downloaded information related to pricing of recyclable materials stored in storage/memory 902. Reference numeral 800 designates the function of said system whereby the user may access general downloaded information relating to recyclable materials stored in storage/memory 902.

The process discussed above is intended to be illustrative and not limiting. Persons skilled in the art could appreciate the steps of the process discussed herein can be omitted, modified, combined, or rearranged, and any additional steps can be performed without departing from the scope of the invention.

In addition, it will be apparent to those of ordinary skill in the art that methods involved in the invention may be embodied in a computer program product that includes a machine readable and/or usable medium.

The above-described embodiments of the invention are presented for purposes of illustration and not of limitation.

What is claimed is:

1. A method for collecting information relating to a recycling service providers' desirability, proximity and utility, and assembling directional, pricing and service data relating to the consumer, where the method comprises the acts of:

a. electronically receiving preselected information about providers of predetermined recycling services and indexing said preselected information in a private information database;
   b. capturing global positioning system or geographic locator ("GPS") information about a consumer via the consumer's computerized mobile interface device;
   c. capturing GPS information about nearby providers of predetermined recycling services via the consumer's computerized mobile interface device;
   d. electronically transmitting the preselected information about the nearby providers of predetermined recycling services received in (1)(a) from the private information database to the consumer's computerized mobile interface device;
   e. electronically assembling a dynamic data record by combining the preselected information received in (1)(d) with the GPS information about the consumer captured in (1)(b) and the providers of predetermined recycling services captured in (1)(c);
   f. storing the dynamic data record on the consumer's computerized mobile interface device;
   g. periodically updating the dynamic data record with updated and/or additional preselected information and GPS information about the consumer and the providers of predetermined recycling services; and
   h. analyzing the dynamic data record stored in the consumer's computerized mobile interface device to determine whether the consumer meets predetermined criterion to receive directional, pricing and service information relating to specific providers of predetermined recycling services.

2. The method of claim 1, in which the preselected information is voluntarily made available and periodically updated by the providers of predetermined recycling services.

3. The method of claim 2, in which the preselected information includes pricing information related to specific materials and services.

4. The method of claim 2, in which the preselected information includes unique profile information relating to said providers of predetermined recycling services.

5. The method of claim 1, in which the dynamic data record assembled in (1)(e) is accessed to allow the consumer to send requests directly to the most convenient providers of predetermined recycling services.

6. The method of claim 1, in which the dynamic data record assembled in (1)(e) is accessed to allow the consumer to request information related to the materials and services provided by the most convenient providers of predetermined recycling services, directly from the private information database referenced in (1)(a).

7. The method of claim 1, in which the consumer's computerized mobile interface device comprises of a mobile computer system containing microchip(s) or processor(s) capable of performing complex computations and displaying output in textual or pictorial form, a memory chip or hard-drive capable of storing information, a display screen capable of displaying text and pictorial images, a networking device capable of connecting the mobile computer system to the world wide web, an interface or input method by which a human being may input information into the mobile computer system, and a GPS device capable of determining or transmitting the current geographic location of the mobile computer system.

* * * * *